United States Patent
Gates (10) Patent No.: US 7,831,527 B2
(45) Date of Patent: Nov. 9, 2010

(54) FEATURE REDUCTION METHOD OF DECISION MACHINES

(75) Inventor: Kevin E. Gates, Taringa (AU)

(73) Assignee: The University of Queensland, St. Lucia, Queensland (AU)

( * ) Notice: Subject to any disclaimer, the term of this patent is extended or adjusted under 35 U.S.C. 154(b) by 606 days.

(21) Appl. No.: 11/721,438

(22) PCT Filed: Dec. 14, 2005

(86) PCT No.: PCT/AU2005/001888

§ 371 (c)(1),
(2), (4) Date: Jun. 12, 2007

(87) PCT Pub. No.: WO2006/063395

PCT Pub. Date: Jun. 22, 2006

(65) Prior Publication Data

US 2009/0204553 A1    Aug. 13, 2009

(30) Foreign Application Priority Data

Dec. 17, 2004 (AU) ............................. 2004907169
Jun. 10, 2005 (AU) ............................. 2005903131

(51) Int. Cl.
*G06F 15/18* (2006.01)

(52) U.S. Cl. ...................................................... 706/12
(58) Field of Classification Search .................... 706/12
See application file for complete search history.

(56) References Cited

U.S. PATENT DOCUMENTS

| | | | |
|---|---|---|---|
| 7,079,955 B2 * | 7/2006 | Oron et al. ..................... 702/20 |
| 7,356,187 B2 * | 4/2008 | Shanahan et al. ........... 382/224 |
| 7,398,191 B1 * | 7/2008 | Gluhovsky et al. ............. 703/2 |
| 7,401,012 B1 * | 7/2008 | Bonebakker et al. ........... 703/2 |
| 7,406,450 B2 * | 7/2008 | Graf et al. ...................... 706/15 |
| 7,415,359 B2 * | 8/2008 | Hill et al. ....................... 702/19 |
| 7,478,074 B2 * | 1/2009 | Gates ........................... 706/16 |

(Continued)

OTHER PUBLICATIONS

Learning automatic acquisition of subcategorization frames using Bayesian inference and support vector machines; Maragoudakis, M.; Kermanidis, K.; Fakotakis, N.; Kokkinakis, G.; Data Mining, 2001. ICDM, Proceedings IEEE International Conference on Digital Object Identifier: 10.1109/ICDM.2001.989583 Publication Year: 2001, pp. 623-625.*

(Continued)

*Primary Examiner*—Michael Holmes
(74) *Attorney, Agent, or Firm*—Panitch Schwarze Belisario & Nadel LLP (57) ABSTRACT

A method for feature reduction in a training set for a learning machine such as a Support Vector Machine (SVM). In one embodiment the method includes a step (35) of receiving input training data vectors $x_i$ of a training set. The input training data vectors are typically derived from a set of features in a feature space. At step (37) the input data vectors are mapped into a multi-dimensional space. At step (39) a least squares problem, derived from a formulation of the SVM, is solved to determine which features comprising the training vectors are to be deemed significant. At step (41) decision parameters and vectors of the chosen decision machine, e.g. SVM, are determined using the features determined to be significant in step (39).

21 Claims, 6 Drawing Sheets

Training Phase

U.S. PATENT DOCUMENTS

2004/0015462 A1    1/2004   Lienhart et al.

OTHER PUBLICATIONS

Unsupervised key-phrases extraction from scientific papers using domain and linguistic knowledge; Krapivin, M.; Marchese, M.; Yadrantsau, A.; Yanchun Liang; Digital Information Management, 2008. ICDIM 2008. Third International Conference on Digital Object Identifier: 10.1109/ICDIM.2008.4746749 Publication Year: 2008 , pp. 105-112.*

Learning automatic acquisition of subcategorization frames using Bayesian inference and support vector machines, Maragoudakis, M.; Kermanidis, K.; Fakotakis, N.; Kokkinakis, G.; Data Mining, 2001. ICDM, Proceedings IEEE International Conference on Digital Object Identifier: 10.1109/ICDM.2001.989583 Pub Year: 2001 , pp. 623-625.*

Speech emotion recognition combining acoustic features and linguistic information in a hybrid support vector machine-belief network architecture, Schuller, B.; Rigoll, G.; Lang, M.; Acoustics, Speech, and Signal Processing, Proceedings. (ICASSP '04). IEEE Intl Conference on vol. 1 Digital Object Identifier: 10.1109/ICASSP.2004 pp. 577-580.*

One-sided Sampling for Learning Taxonomic Relations in the Modern Greek Economic Domain, Kermanidis, K.; Fakotakis, N.; Tools with Artificial Intelligence, 2007. ICTAI 2007. 19th IEEE International Conference on vol. 2 Digital Object Identifier: 10.1109/ICTAI.2007.72 Publication Year: 2007 , pp. 354-361.*

Study on Prediction of Prosodic Phrase Boundaries in Chinese TTS, Ziping Zhao; Yaoting Zhu; Software Engineering, Artificial Intelligence, Networking, and Parallel/Distributed Computing, 2007. SNPD 2007. Eighth ACIS International Conference on vol. 3 Digital Object Identifier: 10.1109/SNPD.2007.67 Publication Year: 2007 , pp. 354-361.*

Lee, Y.J. and Mangasarian, O.L. 'RSVM: Reduced Support Vector Machine', Computer Sciences Dept., Univ. of Wisconsin, Madison, Wisconsin, Jul. 2000.

International Search Report for PCT/AU2005/001888, Date of Mailing: Feb. 6, 2006, 1 page.

Supplementary European Search Report and European Search Opinion for EP 05815793.4 (PCT/AU2005/001888), Date of Mailing: Dec. 12, 2009, 9 pages.

Avidan, Shai, "Joint feature-basis subset selection," Computer Society Conference on Computer Vision and Pattern Recognition (CVPR'04), 1063-6919/04, 2004©, 8 pages.

Chen, Jihong, "Sparse Modeling in Classification, Compression and Detection," A Thesis Presented to The Academic Faculty, School of Industrial and Systems Engineering Georgia Institute of Technology, Jul. 2004, 121 pages.

Gates, K. E., "Fast and Accurate Face Recognition Using Support Vector Machines," Computer Society Conference on Computer Vision and Pattern Recognition (CVPR'05), 2005©, 5 pages.

Masters, Annette Louise, "Some extensions to support vector machines," http://library.uq.edu.au/record=b216056-S7, St. Lucia, Qld. 2003, 3 pages.

Schölkopf, Bernhard, et al., "Input Space Versus Feature Space in Kernel-Based Methods," IEEE Transactions on Neural Networks, 10(5), Sep. 1999, 18 pages.

Valyon, József, et al., "A Weighted Generalized LS-SVM," Periodica Polytechnica Ser. El Eng., 47(3-4), pp. 229-251, (2003).

Zhu, Yongsheng et al., "A new type SVM—projected SVM," Science in China Ser. G Physics, Mechanics & Astronomy, 2004, vol. 47 Supp. 21-28.

* cited by examiner

FEATURE REDUCTION METHOD OF DECISION MACHINES

FIELD OF THE INVENTION

The present invention relates to a method for selecting a reduced set of features for a decision machine such as a Support Vector Machine or Principal Component Analysis system.

BACKGROUND TO THE INVENTION

The reference to any prior art in this specification is not, and should not, be taken as an acknowledgement or any form of suggestion that the prior art forms part of the common general knowledge.

A decision machine is a universal learning machine that, during a training phase, determines a set of parameters and vectors that can be used to classify unknown data. For example, in the case of the Support Vector Machine (SVM) the set of parameters consists of a kernel function and a set of support vectors with corresponding multipliers that define a decision hyperplane. The set of support vectors is selected from a training population of vectors.

In the case of a decision machine operating according to one of Principal Component Analysis, Kernel Principal Component Analysis (KPCA), Independent Component Analysis (ICA) and Linear Discriminant Analysis (LDA), a subspace and a corresponding basis is determined that can be used to determine the distance between two different data vectors and thus the classification of unknown data. Bayesian Intrapersonal/Extrapersonal Classifiers classify according to a statistical analysis of the differences between the groups being classified.

Subsequent to the training phase all of these decision machines operate in a testing phase during which they classify test vectors on the basis of the decision vectors and parameters determined during the training phase. For example, in the case of a classification SVM the classification is made on the basis of the decision hyperplane previously determined during the training phase. A problem arises however as the complexity of the computations that must be undertaken to make a decision scales with the number of support vectors used and the number of features to be examined (i.e. the length of the vectors). Similar difficulties are also encountered in the practical application of most other learning machines.

Decision machines find application in many and varied fields. For example, in an article by S. Lyu and H. Farid entitled "Detecting Hidden Messages using Higher-Order Statistics and Support Vector Machines" (*5th International Workshop on Information Hiding*, Noordwijkerhout, The Netherlands, 2002) there is a description of the use of an SVM to discriminate between untouched and adulterated digital images.

Alternatively, in a paper by H. Kim and H. Park entitled "Prediction of protein relative solvent accessibility with support vector machines and long-range interaction 3d local descriptor" (*Proteins: structure, function and genetics*, 2004 Feb. 15; 54(3):557-62) SVMs are applied to the problem of predicting high resolution 3D structure in order to study the docking of macro-molecules.

In order to develop this method for feature reduction the mathematical basis of an SVM will now be explained. It will however be realised that methods according embodiments of the present invention are applicable to other decision machines including those mentioned previously.

An SVM is a learning machine that given m input vectors $x \in \mathcal{R}^d$, drawn independently from the probability distribution function p(x) with an output value $y_i$, for every input vector $x_i$, returns an estimated output value $f(x_i) = y_i$ for any vector $x_i$, not in the input set.

The $(x_i, y_i)$ $i=0, \ldots$ m are referred to as the training examples. The resulting function $f(x)$ determines the hyperplane which is then used to estimate unknown mappings.

Figure 1:
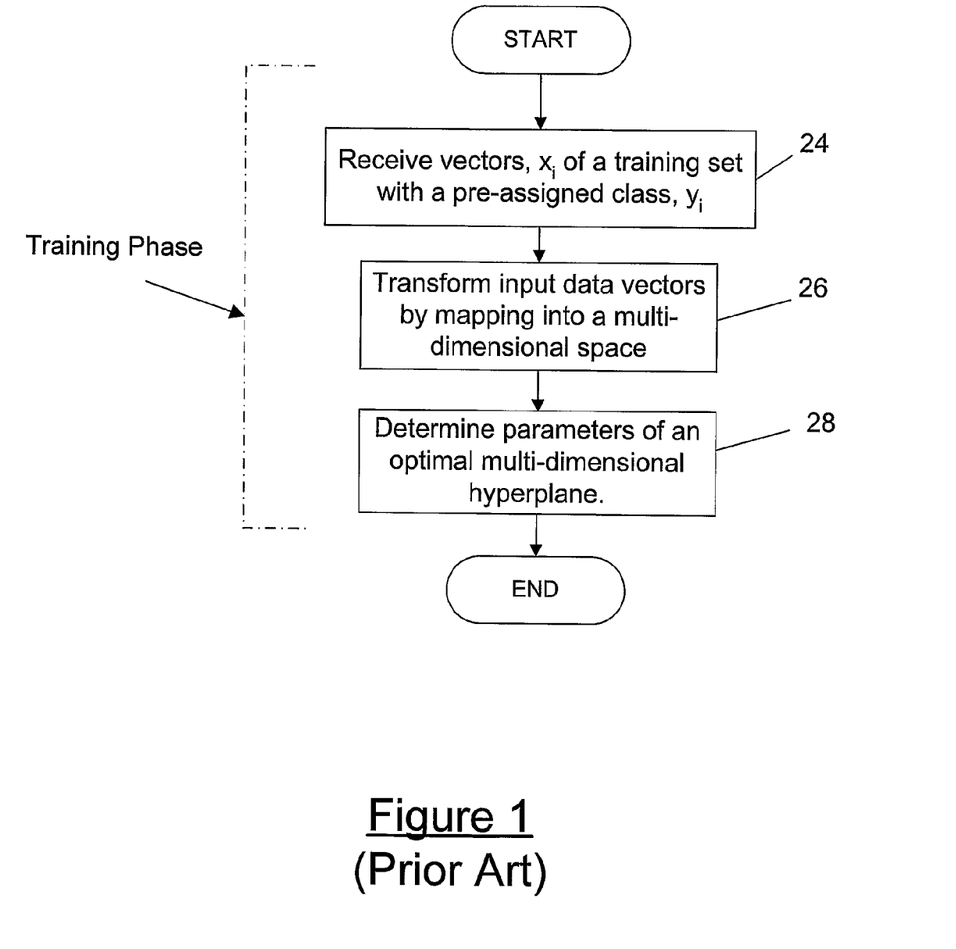
FIG. 1 is a flowchart depicting a training phase during implementation of a prior art support vector machine.

FIG. 1, illustrates the above training method. At step 24 the support vector machine receives a vectors $x_i$ of a training set each with a pre-assigned class $y_i$. At step 26 the vector machine transforms the input data vectors $x_i$ by mapping them into a multi-dimensional space. Finally at step 28 the parameters of the optimal multi-dimensional hyperplane defined by $f(x)$ is determined. Each of steps 24, 26 and 28 of FIG. 1 are well known in the prior art.

With some manipulations of the governing equations the support vector machine can be phrased as the following Quadratic Programming problem:

$$\min W(\alpha) = \tfrac{1}{2}\alpha^T \Omega \alpha - \alpha^T \quad (1)$$

where $$\Omega_{i,j} = y_i y_j K(x_i, x_j) \quad (2)$$

$$e = [1, 1, 1, 1, \ldots, 1]^T \quad (3)$$

Subject to $$0 = \alpha^T y \quad (4)$$

$$0 \leq \alpha_i \leq C \quad (5)$$

where $$\text{C is some regularization constant.} \quad (6)$$

The $K(x_i, x_j)$ is the kernel function and can be viewed as a generalised inner product of two vectors. The result of training the SVM is the determination of the multipliers $\alpha_i$.

Figure 2:
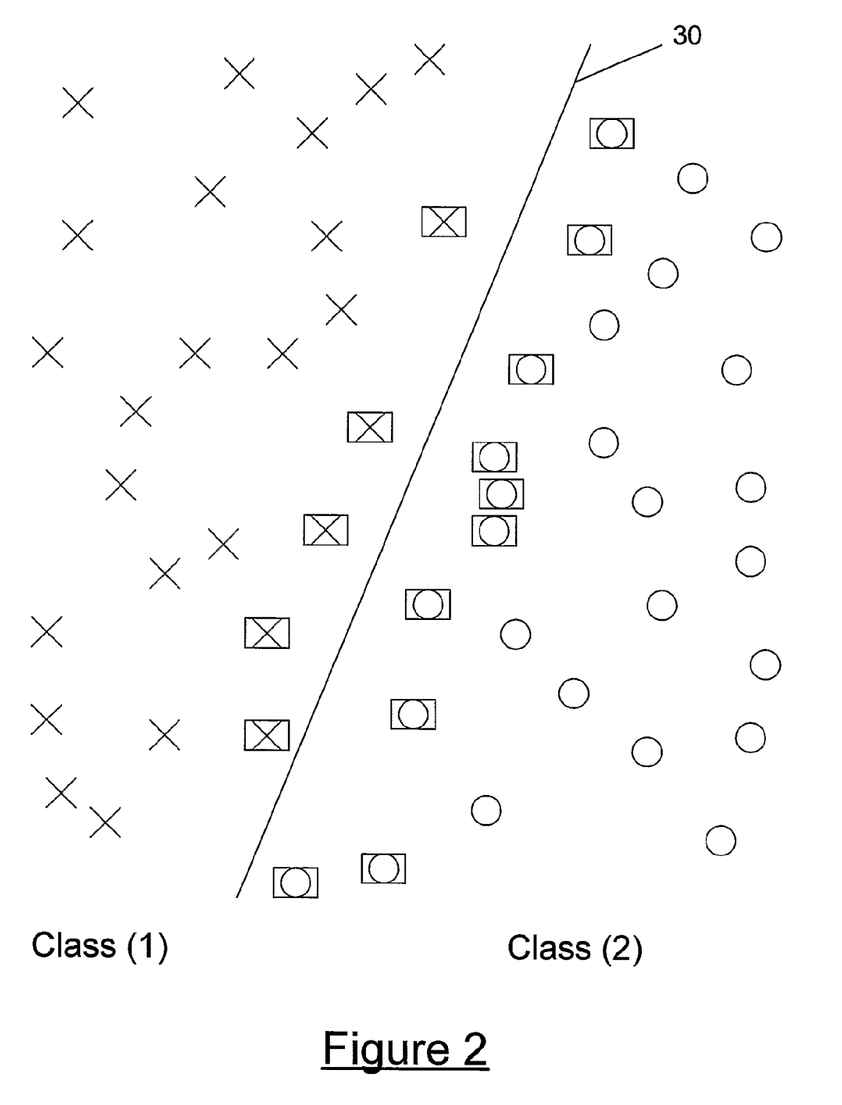
FIG. 2 is a diagram showing a number of support vectors on either side of a decision hyperplane.

Suppose we train a SVM classifier with pattern vectors $x_i$, and that r of these vectors are determined to be support vectors, Denote them by $x_i$, $i=1, 2 \ldots, r$. The decision hyperplane for pattern classification then takes the form $$f(x) = \sum_i^r \alpha_i y_i K(x, x_i) + b \quad (7)$$

where $\alpha_i$ is the Lagrange multiplier associated with pattern $x_i$ and $K(.,.)$ is a kernel function that implicitly maps the pattern vectors into a suitable feature space. The b can be determined independently of the $\alpha_i$. FIG. 2 illustrates in two dimensions the separation of two classes by hyperplane 30. Note that all of the x's and o's contained within a rectangle in FIG. 2 are considered to be support vectors and would have associated non-zero $\alpha_i$.

Given equation (7) an un-classified sample vector x may be classified by calculating $f(x)$ and then returning −1 for all returned values less than zero and 1 for all values greater than zero.

Figure 3:
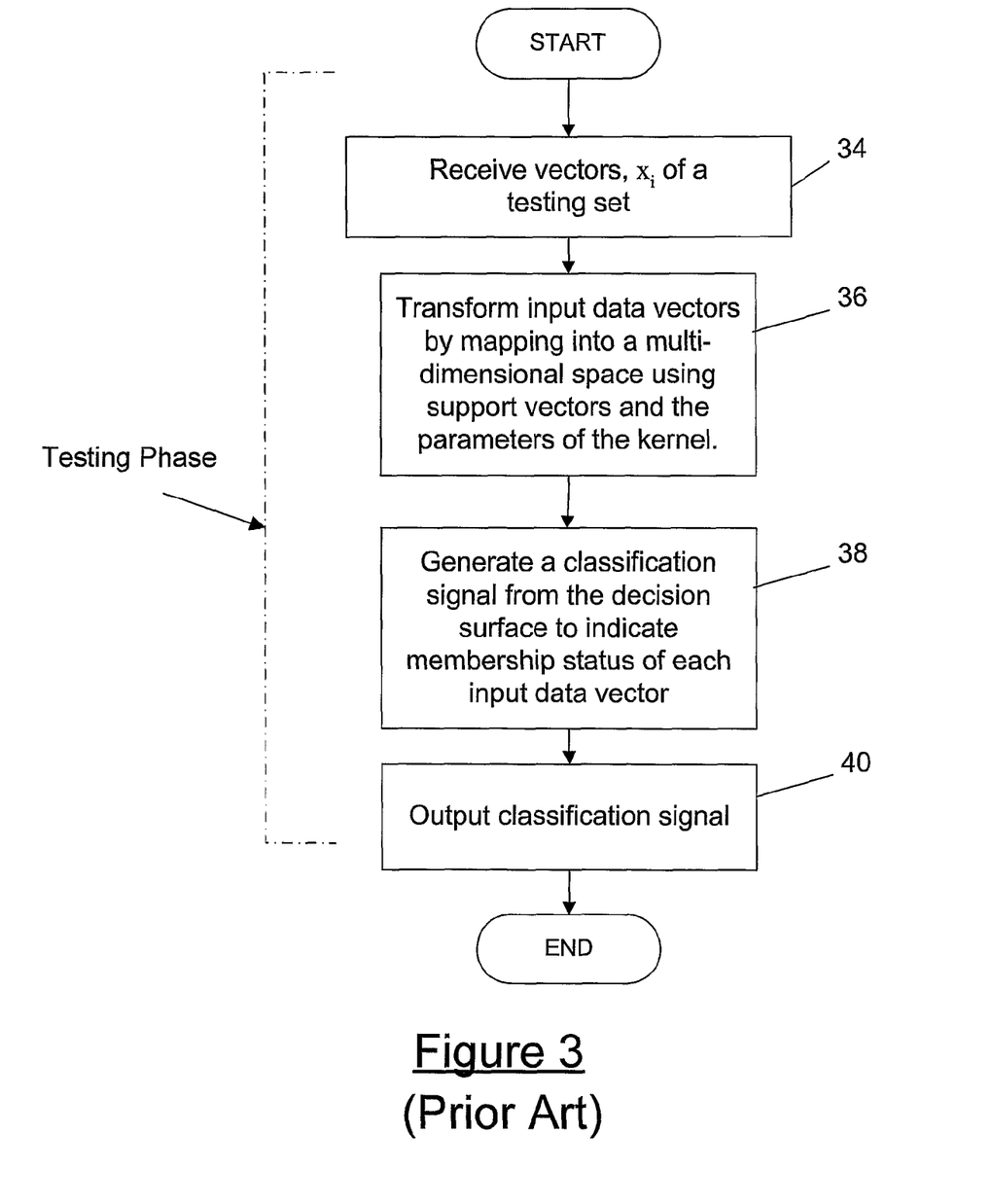
FIG. 3 is a flowchart depicting a testing phase during implementation of a prior art support vector machine.

FIG. 3 is a flow chart of a typical method employed by prior art SVMs for classifying vectors $x_i$ of a testing set. At box 34 the SVM receives a set of test vectors. At box 36 it transforms the test vectors into a multi-dimensional space using support vectors as parameters in the kernel function. At box 38 the SVM generates a classification signal from the decision surface to indicate membership status, member of a first class "1" or of a second class "−1", of each input data vector. Steps 34 through 40 are defined in the literature and by equation (7).

It will be realised that in both the training and testing phases, the computational complexity of the operations needed to define the hyperplane, and to subsequently classify input vectors, is at least in part dependent on the size of the vectors $x_i$. The size of the vectors $x_i$ is in turn dependent upon the number of features being examined in the problem from which the $x_i$ are derived.

In the early phase of learning machine research and development few problems involved more than 40 features. However, it is now relatively common for problems involving hundreds to tens of thousands of variables or features to be addressed. Consequently the computations required to determine the test surface, and to perform classification has increased.

An example of this sort of problem is the classification of undesired email or "spam" and normal email. If the words or phrases used in the messages are used for classification then the number of features can be the size of the number of commonly used words. This number for an adult English speaker can easily exceed 5 to 10 thousand words. If we add misspellings of common words and proper and generic names of drugs and other products then this list of features can easily exceed 50 thousand words. The actual features (words or phrases) that are needed to separate spam and email may be considerably less than the total number of features. For example the word "to" will not add to the determination of a decision surface, but will be evident in many emails.

The problem of dealing with a very large number of features is discussed in a paper by Guyon and Elisseeff, entitled "An introduction to variable and feature selection", *Journal of Machine Learning Research,* 3, 1157-1182, 2003. In that paper the authors explain that "There are many potential benefits of variable and features selection: facilitating data visualization and data understanding, reducing the measurement and storage requirements, reducing training and utilization times, defying the curse of dimensionality to improve prediction performance." The authors of the article go on to state that they are unaware of any direct method for feature selection in the case of nonlinear learning systems.

It is an object of the invention to provide a method for feature selection that provides one or more of the potential benefits described above.

SUMMARY OF THE INVENTION

According to a first aspect of the present invention there is provided a method of operating at least one computational device as a decision machine to solve a problem having a solution dependent upon vectors derived from a set of features in a feature space, the method including operating said computational device to perform the steps of:

(a) solving a minimization problem corresponding to an SVM quadratic programming formulation of the problem in order to identify significant features of said set; and (b) solving the problem by operation of the decision machine in a reduced number of computational steps on the basis of the identification of the significant features.

The method may further include:

programming at least one computational device with computer executable instructions corresponding to steps (a) and (b) and storing the computer-executable instructions on a computer readable media.

In the preferred embodiment the step of solving the minimization problem comprises solving a least squares problem.

The computational device may be operated as a decision machine to solve a problem comprising a classification problem or alternatively to solve a problem comprising a regression problem.

Preferably the decision machine operates on the basis of one of the following: a Principal Component Analysis, Kernel Principal Component Analysis (KPCA), Independent Component Analysis (ICA), Linear Discriminant Analysis (LCA), and Bayesian Intrapersonal or Extrapersonal Classifiers.

Preferably the method includes processing only significant features when solving the problem.

The decision machine may comprise any one of the following: a support vector machine, a principal component analysis machine, a kernel principal component analysis machine, an independent component analysis machine or a linear discriminant analysis machine.

Where the decision machine comprises a support vector classification machine the method may further include defining a hyperplane separating the vectors into discrete classes.

Preferably the hyperplane is defined using vectors containing only significant features.

Alternatively, the support vector machine may comprise a support vector regression machine.

In one embodiment the method involves comparing a value of the solution of the minimization problem to a predetermined threshold value in order to determine if a corresponding feature is to be deemed insignificant.

The method will preferably include normalising the solution of the minimization problem.

In a preferred embodiment the step of solving the minimization problem will include minimizing the square of a 2-norm.

Alternatively, the step of solving the minimization problem may include minimizing with respect to another suitable norm such as a 1-norm or an infinity norm.

The method may include a step of mapping the least squares problem into the feature space. In that case the method provides a direct method for feature selection in non-linear learning systems.

Preferably the method further includes a step of classifying test vectors derived from the feature space.

According to a further aspect of the present invention there is provided a computational device programmed to perform the above-described method.

The computational device may comprise a conventional computer system such as a personal computer however it could also be incorporated into a personal digital assistant, a diagnostic medical device or a wireless device such as a cell phone, for example.

According to another aspect of the present invention there is provided a media, for example a magnetic or optical disk, bearing machine readable instructions for execution by one or more processors to implement the above described method.

Further preferred features of the present invention will be described in the following detailed description of an exemplary embodiment wherein reference will be made to a number of figures as follows.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF EXEMPLARY EMBODIMENTS

The present inventor has realised that a method for feature selection in the case of non-linear learning systems may be developed through the solving of a minimization problem. More particularly, the method may be developed out of a least squares approach. In the following embodiment a 2-norm formulation of the least squares minimization problem is used. However, those skilled in the art will realise that a 1-norm, infinity-norm or other suitable formulation might also be used.

The minimization problem of equations (1-3) is equivalent to $$\underset{\alpha}{\text{Minimise}} \; \|K\alpha - e\|_2^2 \quad (8)$$

where the (i,j) entry in K is K $(x_i, x_j)$, $\alpha$ is the vector of Lagrange multipliers and e is a vector of ones. The constraint equations (4-6) will also apply to (8). The notation outside the norm symbol indicates that we are taking the square of the 2-norm. We will first develop the theory for a linear kernel where K $(x_i, x_j) = x_i^T \cdot x_j$ is a simple inner product of two vectors. Writing our input vectors as a matrix: $X=[x_1, \ldots, x_k]$ we will write $e=X^T b$ for some vector b and then rewrite the above problem as:

$$\underset{\alpha}{\text{Minimise}} \; \|X^T X\alpha - X^T b\|_2^2 \quad (9)$$

This is the normal equation formulation for the solution of $$\underset{a}{\text{Minimise}} \; \|Xa - b\|_2^2 \quad (10)$$

so that (9) and (10) are equivalent. The first step in the solution of (10) is to solve the underdetermined least squares problem that will have multiple solutions $$\underset{b}{\text{Minimise}} \; \|X^T b - e\|_2^2 \quad (11)$$

any solution is sufficient. However the desired and feasible solution is $$b = P \begin{bmatrix} b_1 \\ b_2 \end{bmatrix} \quad (12)$$

where P is an appropriate pivot matrix and $b_2=0$. The size of $b_2$ is determined by the rank of the matrix X, or the number of independent columns of X. To solve (12) we use any method that gives a minimum 2-norm solution and meets the constraints of the SVM problem. It is in the solution of (11) that an opportunity for natural selection of the features arises since only the nonzero elements of b contribute to the solution. For example, suppose that the non-zero, or very small, elements of $b=[b_1, \ldots, b_n]^T$ are $b_{100}, b_1, b_{191}, b_{202}, b_{323}, b_{344}$, etc. In that case only $x_{100}, x_1, x_{191}, x_{202}, x_{323}, x_{344}$ etc. are used in the vectors x. The other elements of x can be safely ignored without changing the performance of the SVM.

A second motivation for this approach is the fact that equation (9) contains inner products that can be used to accommodate the mapping of data vectors into feature space by means of kernel functions. In this case the X matrix becomes $[\Phi(x_1), \ldots, \Phi(x_n)]$ so that the inner product $X^T X$ in (9) gives us the kernel matrix. The problem can therefore be expressed as in (8) with $e=\Phi(x) \cdot \Phi(b)$. To find b we must then solve the optimisation problem $$\underset{b}{\text{Minimise}} \; \|\Phi(x) \cdot \Phi(b) - e\|_2^2 \quad (13)$$

where $\Phi(x) \cdot \Phi(b)$ is computed as K $(x_i, b)$.

Figure 4:
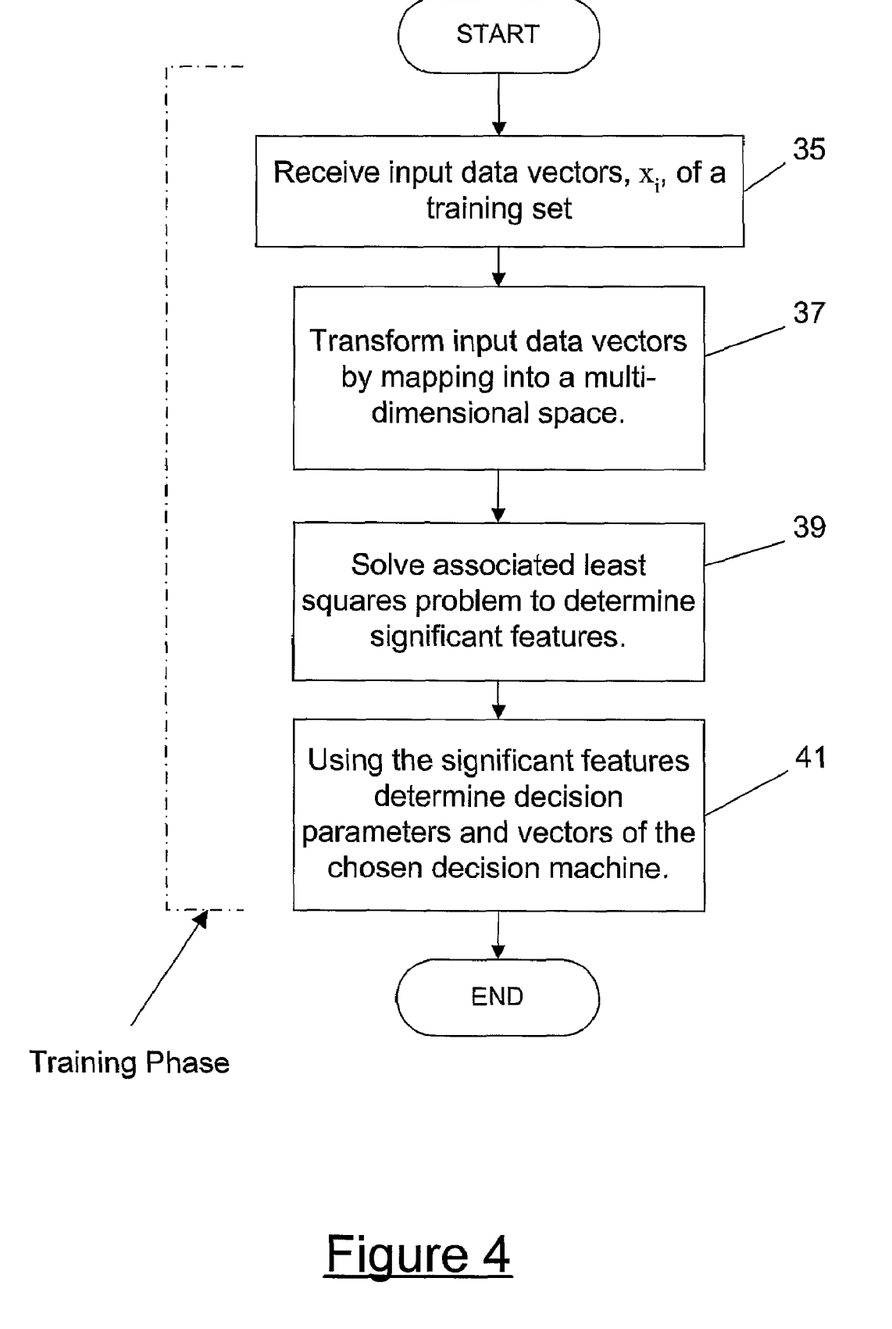
FIG. 4 is a flowchart depicting a training phase method according to a preferred embodiment of the present invention.

Thus a method according to an embodiment of the present invention can be readily extended to kernel feature space in order to provide a direct method for feature selection in non-linear learning systems. A flowchart of a method according to an embodiment of the present invention is depicted in FIG. 4. At box 35 the decision machine, for example an SVM, receives a test set of vectors $x_i$. At box 37 the test data vectors are mapped into a multi-dimensional space, for example by carrying out equation (2). At box 39 an associated optimisation problem (equation (13)) is solved to determine which of the features making up the test vectors are active, i.e. significant. An example of this step is described with reference to equations (8)-(12) above. At box 41 the decision parameters for the particular type of decision machine are determined using only the active features. For example, in the case of a classification SVM an optimal multi-dimensional hyperplane is defined using test vectors containing only the active features through the use of equations (1) to (6) with the reduced feature set.

Figure 5:
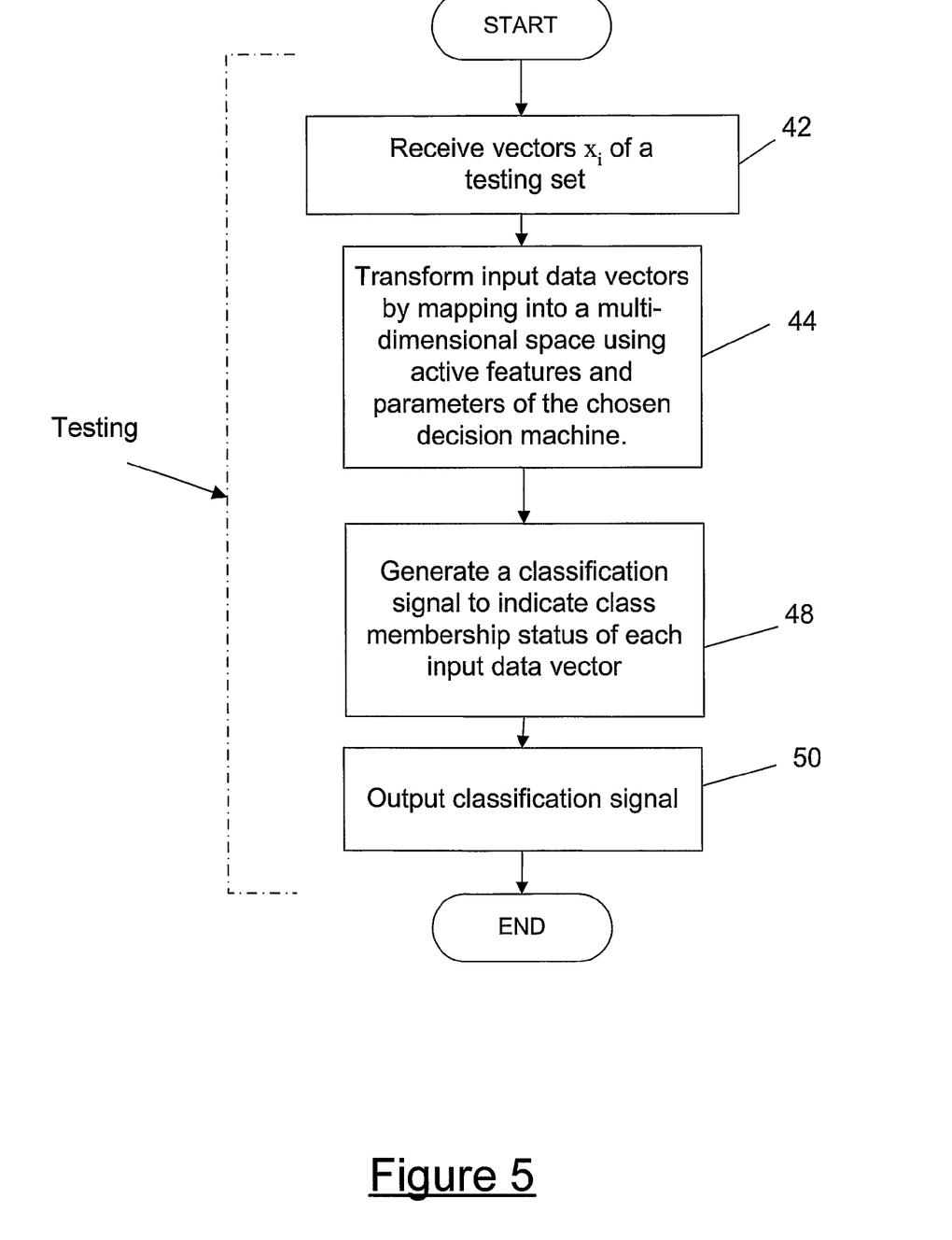
FIG. 5 is a flowchart depicting a testing phase method according to a preferred embodiment of the present invention.

FIG. 5 is a flowchart of a method of classifying test vectors according to an embodiment of the present invention. Initially at box 42 a set of test vectors is received. At box 44, when testing an unclassified vector, there is no need to reduce the unclassified vector to just its active features, the operations inclusive in the inner product $K(x_i, x)$ will automatically use only the active features.

At box 48 a classification for the test vector is calculated. The test result is then presented at box 50.

In the Support Vector Regression problem, the set of training examples is given by $(x_1, y_1), (x_2, y_2), \ldots, (x_m, y_m), x_i \in \mathfrak{R}^d$; where $y_i$ may be either a real or binary value. In the case of $y_i \in \{\pm 1\}$, then either the Support Vector Classification Machine or the Support Vector Regression Machine may be applied to the data. The goal of the regression machine is to construct a hyperplane that lies as "close" to as many of the data points as possible. With some mathematics the following quadratic programming problem can be constructed that is similar to that of the classification problems and can be solved in the same way.

$$\text{Minimise } \frac{1}{2}\lambda^T D\lambda - \lambda^T$$

subject to $$\lambda_g^T = 0$$

$$0 \le \lambda_i \le C$$

where $$\lambda = \lfloor \alpha_1, \alpha_2, \ldots, \alpha_m, \alpha_1^*, \alpha_2^*, \ldots, \alpha_m^* \rfloor$$

$$D = \begin{bmatrix} K(x_i, x_j) & -K(x_i, x_j) \\ -K(x_i, x_j) & K(x_i, x_j) \end{bmatrix}$$

$$c = \begin{bmatrix} y_1 - \varepsilon, y_2 - \varepsilon, \ldots, \\ y_m - \varepsilon, -y_1 - \varepsilon, -y_2 - \varepsilon, \ldots, -y_m - \varepsilon \end{bmatrix}$$

$$g = \begin{bmatrix} \underbrace{1, 1, \ldots, 1}_{m}, \underbrace{1, 1, \ldots, 1}_{n} \end{bmatrix}$$

This optimisation can also be expressed as a least squares problems and the same method for reducing the number of features can be used.

In the case of Principal Component Analysis, Kernel Principal Component Analysis (KPCA), Independent Component Analysis (ICA) and Linear Discriminant Analysis (LCA), and Bayesian Intrapersonal/Extrapersonal Classifiers (Bayesian) decision machines, the training phase proceeds as described above for SVMs until the reduced set of features is determined. The input vectors are then reduced by eliminating all features not in the reduced set and those features are then applied to any one of the above mentioned decision machines. The training and use of each decision machine then proceeds as described in the prior art. From a practical point of view, a decision machine according to a preferred embodiment of the present invention is implemented by means of a computational device, such as a personal computer, PDA, or potentially a wireless device such as a mobile phone. The computational device executes a software product containing instructions for implementing methods according to embodiments of the present invention, such as the embodiments illustrated in the flowcharts of FIG. 4 and FIG. 5.

Figure 6:
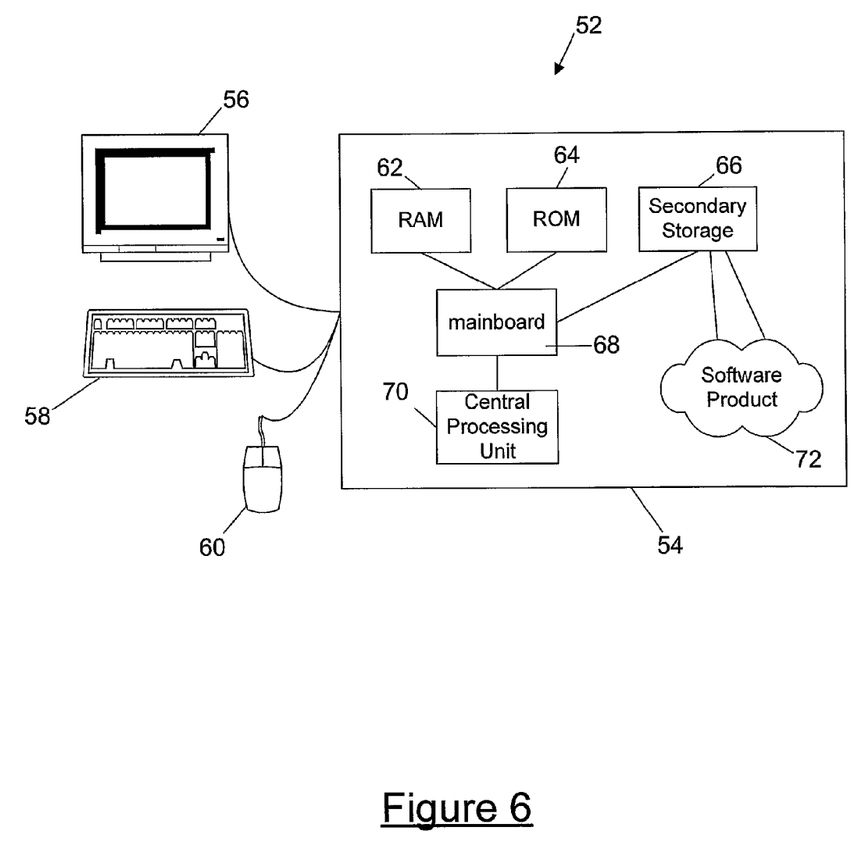
FIG. 6 is a block diagram of a computer system for executing a software product according to an embodiment of the present invention.

FIG. 6 depicts a computational device in the form of a conventional personal computer system 52 which operates as a decision machine, according to an embodiment of the present invention, while executing a decision machine computer program, also according to an embodiment of the present invention. Personal Computer system 52 includes data entry devices in the form of pointing device 60 and keyboard 58 and a data output device in the form of display 56. The data entry and output devices are coupled to a processing box 54 which includes at least one central processing unit 70. Central processing unit 70 interfaces with RAM 62, ROM 64 and secondary storage device 66 via mainboard 68. Secondary storage device 66 includes an optical and/or magnetic data storage medium that bears instructions, for execution by central processor 70. The instructions constitute a software product 72 that when executed causes computer system 52 to operate as a decision machine and to implement the feature reduction method described above with reference to FIG. 4 and equations (8)-(12) and also the testing phase method described with reference to FIG. 5 if required. It will be realised by those skilled in the art that the programming of software product 72 is straightforward given a method according to an embodiment of the present invention. Accordingly, a method according to an embodiment of the invention may include the steps of programming a computer, or one or more computational devices, with computer executable instructions to implement the method and storing the computer-executable instructions on a computer readable media such as an optical or magnetic disk or solid state memory.

The embodiments of the invention described herein are provided for purposes of explaining the principles thereof, and are not to be considered as limiting or restricting the invention since many modifications may be made by the exercise of skill in the art without departing from the scope of the invention determined by reference to the following claims.

The invention claimed is:

1. A method of operating at least one computational device as a decision machine to solve a problem having a solution dependent upon vectors derived from a set of features in a feature space, the method including operating said computational device to perform the steps of:
    (a) solving a minimization problem corresponding to an SVM quadratic programming formulation of the problem to thereby identify significant features of said set; and
    (b) solving the problem by operation of the decision machine in a reduced number of computational steps based on the identification of the significant features.

2. A method according to claim 1, wherein the step of solving a minimization problem comprises solving a least squares problem.

3. A method according to claim 1 wherein the computational device is operated as a decision machine to solve a problem comprising a classification problem.

4. A method according to claim 1 wherein the computational device is operated as a decision machine to solve a problem comprising a regression problem.

5. A method according to claim 1, wherein the decision machine operates according to one of the following: Principal Component Analysis, Kernel Principal Component Analysis (KPCA), Independent Component Analysis (ICA), Linear Discriminant Analysis (LCA), Bayesian Intrapersonal or Extrapersonal Classifiers.

6. A method according to claim 1, including processing only significant features when solving the problem.

7. A method according to claim 1, wherein the decision machine comprises any one of the following: a support vector machine, a principal component analysis machine, a kernel principal component analysis machine, an independent component analysis machine or a linear discriminant analysis machine.

8. A method according to claim 7, wherein the decision machine comprises a support vector classification machine, said method further including:
    defining a hyperplane separating the vectors into discrete classes.

9. A method according to claim 8, including defining the hyperplane using vectors containing only significant features.

10. A method according to claim 7, wherein the decision machine comprises a support vector regression machine.

11. A method according to claim 1, including:
    comparing a value of the solution of the minimization problem to a predetermined threshold value in order to determine if a corresponding feature is to be deemed insignificant.

12. A method according to claim 11, including:
normalising the solution of the minimization problem.

13. A method according to claim 1, wherein the step of solving the minimization problem includes minimizing the square of a 2-norm.

14. A method according to claim 1, wherein the step of solving the minimization problem includes minimizing with respect to a 1-norm.

15. A method according to claim 1, wherein the step of solving the minimization problem includes minimizing with respect to an infinity-norm.

16. A method according to claim 1 including:
mapping the least squares problem into the feature space.

17. A method according to claim 13 including:
classifying test vectors derived from the feature space.

18. A computational device programmed to perform the method of claim 1.

19. A computational device according to claim 15 comprising any one of:
a personal computer;
a personal digital assistant;
a diagnostic medical device; or
a wireless device.

20. A media bearing machine readable instructions for execution by one or more processors to implement the method of claim 1.

21. A method according to claim 1, further including:
programming at least one computational device with computer executable instructions corresponding to steps (a) and (b) and storing the computer-executable instructions on a computer readable media.

* * * * *